United States Patent Office 3,411,085
Patented Nov. 12, 1968

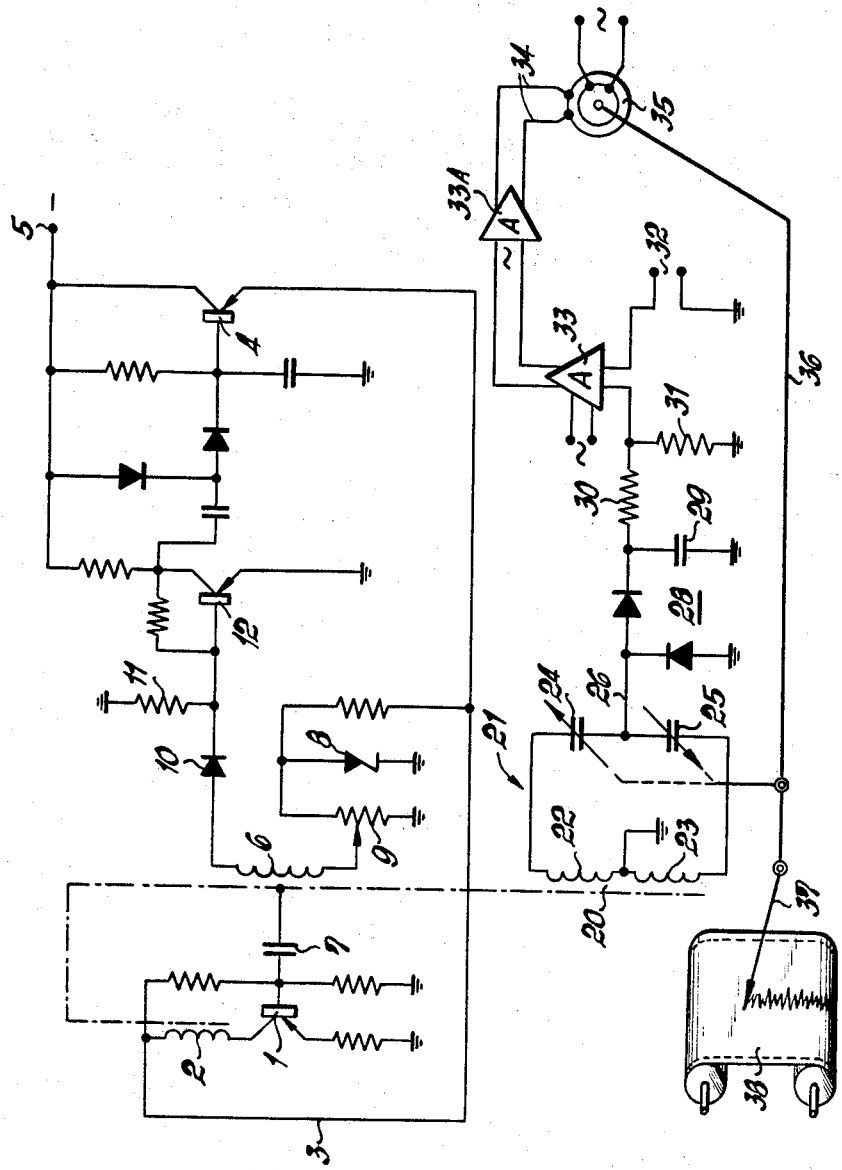
INVENTOR
WINFRIED SCHULZ

3,411,085
DIRECT CURRENT POTENTIOMETER SYSTEM EMPLOYING AUTOMATIC BALANCING
Winfried Schulz, Berlin, Germany, assignor to Continental Elektroindustrie Aktiengesellschaft, Askania-Werke, Berlin-Mariendorf, Germany, a corporation of Germany
Filed Aug. 26, 1964, Ser. No. 392,240
Claims priority, application Germany, June 11, 1964,
C 33,098
7 Claims. (Cl. 324—99)

ABSTRACT OF THE DISCLOSURE

A self-balancing direct current potentiometer system in which a stabilized alternating signal source is used to drive a bridge circuit having variable reactance elements (for example, capacitors). The output of the bridge circuit is rectified and compared with the direct current to be measured by the system. A control motor is activated to an extent determined by the results of the comparison. This motor in turn controls the setting of the bridge reactance elements in such sense as to equalize the rectified bridge circuit output and the direct current to be measured by the system.

---

The invention relates to D-C potentiometers and particularly to recording potentiometers employing automatic balancing of the direct current flowing through a fixed impedance. The type of potentiometer in question comprises a constant current source productive of direct current, an impedance connected to that current source and adjustable by a control motor to vary the current derived from said source, and means for determining the difference between the unknown unidirectional voltage to be measured and the voltage developed across a fixed impedance by the variable current and for actuating the control motor accordingly.

Heretofore, high-precision recording potentiometers have preferably utilized compensating potentiometers arranged in known manner in thermoelectric E.M.F. free circuit configurations and so connected that the voltage to be measured was compensated or balanced by an opposing variable voltage derived from the sliding contact of a slide-wire potentiometer resistor traversed by a constant direct current. The position of this sliding contact represented the value of the unknown voltage to be measured, and was recorded as such. Displacement of the sliding contact was effected by a motor actuated, after suitable amplification, by the potential difference between the unidirectional voltage to be measured and the compensating unidirectional voltage in such sense as to reduce that difference to zero.

These prior art potentiometer instruments required a great deal of maintenance because the slide-wire potentiometer resistors which they employed rapidly became dirty and worn, thereby impairing the operation of the whole instrument. It was, therefore, necessary not only to clean the relatively costly slide-wire potentiometer resistor carefully at intervals, but also to replace it with a new one from time to time.

Accordingly, it is an object of the present invention to provide an improved automatic D-C potentiometer characterized in that the sensitive component of this recording instrument no longer causes either improper functioning of the recorder, or reduction in the accuracy of the instrument.

This and other objects which will appear are accomplished by means of a direct potentiometer employing automatic balancing and characterized in that the current source is in the form of an amplitude-stabilized alternating signal source, followed by a motor-operated inductive or capacitive impedance for controlling the balancing current. A rectifier is provided intermediate that impedance and the fixed impedance element of the potentiometer. The adjustable elements of the inductive or capacitive control impedance are provided with means for indicating their adjustment.

In a direct current potentiometer conforming to the present invention the alternating signal source preferably takes the form of a high frequency oscillator. This oscillator preferably feeds an impedance bridge which can be balanced by inductive or capacitive control impedance and whose variable bridge potential controls the balancing current.

For further details reference may be made to the accompanying drawing which illustrates a preferred embodiment of the invention.

In that drawing the invention is applied to a recording potentiometer for indicating temperatures measured by means of a thermoelectric element or a radiation pyrometer.

The apparatus illustrated comprises a transistor 1 constituting the active circuit element of a sinewave oscillator and connected via coil 2, lead 3 and regulating transistor 4 to a source of supply voltage 5. A second winding 6 is mounted on the same core as coil 2. This winding 6 has a tap through which the oscillator signal is fed back via capacitor 7 to the base of transistor 1.

To control the amplitude of the oscillator output signal, the signal developed by that oscillator across winding 6 is compared with the fixed Zener voltage of a Zener diode 8. The reference signal potential is applied to a potentiometer 9, the various interconnections being such that a pulse-like current flows through diode 10 whenever the oscillator signal amplitude exceeds that of the reference signal. This current produces a corresponding voltage drop across resistor 11.

The voltage drop thus developed across resistor 11 controls a transistor amplifier arrangement 12, which may, if necessary, consist of several stages of amplification. The output signal from that amplifier arrangement in turn controls regulating transistor 4 in the sense required to maintain a fixed oscillator signal amplitude. The oscillator 1 preferably operates at a fixed frequency of 100 kc. and its output signal is derived by means of winding 20.

Output winding 20 forms part of a bridge circuit 21 which, in addition to winding halves 22 and 23, also includes capacitors 24 and 25. These capacitors 24 and 25 are connected in a differential arrangement and are adjustable in opposite senses. More particularly, when the capacitance of capacitor 24 is changed the capacitance of capacitor 25 changes by the same amount but in the opposite sense. Thus, as the capacitance of capacitor 24 increases, that of capacitor 25 decreases by the same amount. Bridge 21 can be designed to balance in such manner that no alternating potential appears at junction 26 when capacitors 24 and 25 have equal values. The movable elements of both capacitors 24 and 25 are mechanically linked and are adjustable by a linkage mechanism of any conventional form, diagrammatically illustrated at 27.

The output of bridge circuit 21 is connected to a rectifier 28, a filter capacitor 29 and a high resistance 30. Through resistor 31 there then flows a unidirectional current proportional to the degree of unbalance of bridge circuit 21. The resulting voltage developed across resistor 31 is compared with the unidirectional voltage to be measured, which latter is applied to terminals 32. The difference potential is amplified by means of a D-C amplifier 33, which preferably takes the form of a modulator amplifier, sometimes also referred to as a chopper amplifier. The amplifier unidirectional potential controls an alternating current amplifier 33a which also forms part of amplifier 33. This amplifier produces a fixed frequency alternating current whose amplitude varies in accordance with the magnitude of the control signal at the input to amplifier 33 and whose phase angle undergoes a 180° displacement in response to changes in the polarity of this control signal. The output signal of amplifier 33 is supplied via lead 34 as a control signal to the control winding of a two-phase induction motor 35. The rate of motor rotation varies in response to the amplitude of the control signal and the direction of motor rotation reverses in response to reversals in the phase angle of the control signal. The shaft of motor 35 is coupled via conventional couplings 36 to the linkage 27 and to a recording device 37 displaceable over the paper chart 38 of a chart-type recorder. These couplings and linkages are so arranged that, whenever the difference signal at the input to amplifier 33 is other than zero, the motor 35 will displace these couplings and linkages 27, 36, and thereby readjust capacitors 24 and 25 in such a manner that the current flowing through resistor 31 develops across this resistor a voltage drop equal to the voltage to be measured which is applied to terminals 32, having been developed, for example, by a thermoelectric element.

The apparatus described above has the advantage that the impedence which determines the balancing current has no parts subject to malfunction. Moreover the current under its control is continuously variable in response to displacement of the movable element of the impedance. Consequently, recording apparatus embodying the invention has the further advantage that the line which it traces on chart 38 is continuously variable in accordance with variations in the voltage to be measured. This was not the case for recorders employing potentiometer resistors, whose traces were subject to discontinuities due to discontinuous transitions between successive turns of the potentiometer resistor winding.

It will be understood that many modifications of the apparatus described and illustrated herein may be made without departing from the inventive concept. For example, the unbalance representative output signal from bridge circuit 21 may be supplied, either directly or after rectification, to a differentiating circuit whose output is then applied to an input of the control circuit for motor 35 as a bucking signal proportional to speed, thereby stabilizing the operation of the resistor.

I claim:
1. Direct current potentiometer system having a fixed balancing impedance and employing automatic balancing of the potentiometer current flowing through said fixed balancing impedance, said potentiometer system comprising a source productive of said current,
   a control impedance for controlling said current connected to said current productive source,
   a balancing motor for varying said control impedance,
   means for determining the difference between a unidirectional potential to be measured by said potentiometer system and the voltage drop developed across said balancing impedance by said current and for controlling said balancing motor accordingly, said potentiometer system being further characterized in that:
      said current productive source comprises an amplitude stabilized alternating signal source,
      said control impedance is a variable reactive impedance controlled by said balancing motor,
      a rectifier means is connected between said reactive impedance and said fixed impedance, and
      the movable element of said variable impedance is coupled to a device for recording the position of said element.

2. The potentiometer system of claim 1 further characterized in that said alternating signal source feeds an impedance bridge circuit having at least one impedance which is adjustable by said balancing motor, and in that the output signal from said bridge circuit is supplied to said rectifier means.

3. The potentiometer system of claim 2 further characterized in that adjacent arms of said bridge circuit include variable capacitors, variable by equal amounts but in opposite directions by means of linkages connecting said capacitors to said balancing motor.

4. The potentiometer system of claim 1 further characterized in that said alternating signal source is a high frequency oscillator.

5. The potentiometer system of claim 1 further characterized in that said potential to be measured is derived from a temperature sensing means.

6. The potentiometer system of claim 1 characterized in that said alternating signal source comprises a high frequency transistor oscillator.

7. The potentiometer system of claim 6 further characterized in that said oscillator is amplitude stabilized by means of a reference potential developed by a Zener diode with which said alternating signal from said source is compared.

References Cited

UNITED STATES PATENTS

| | | | |
|---|---|---|---|
| 2,011,315 | 8/1935 | Gilbet | 324—99 |
| 2,104,463 | 1/1938 | Johnson et al. | 321—2 |
| 2,548,790 | 4/1951 | Higinbotham et al. | 340—200 |
| 2,617,842 | 11/1952 | Fink | 324—99 |
| 2,618,674 | 11/1952 | Stanton | 324—98 |
| 3,158,026 | 11/1964 | McGhee | 324—99 X |
| 3,278,919 | 10/1966 | Fleming | 323—75 |
| 3,284,724 | 11/1966 | Marlow | 331—109 |

FOREIGN PATENTS

| | | |
|---|---|---|
| 1,023,725 | 12/1952 | France. |
| 1,035,608 | 4/1953 | France. |

RUDOLPH V. ROLINEC, *Primary Examiner.*

E. F. KARLSEN, *Assistant Examiner.*